(12) United States Patent
Zavaleta et al.

(10) Patent No.: US 11,605,117 B1
(45) Date of Patent: Mar. 14, 2023

(54) PERSONALIZED MEDIA RECOMMENDATION SYSTEM

(71) Applicant: Amazon Technologies, Inc., Seattle, WA (US)

(72) Inventors: Stephen Javier Zavaleta, Seattle, WA (US); Geoffrey Mattei, Seattle, WA (US); Benjamin La Schiazza, Seattle, WA (US); Jason Hall, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 225 days.

(21) Appl. No.: 16/388,355

(22) Filed: Apr. 18, 2019

(51) Int. Cl.
- *G06Q 30/00* (2012.01)
- *G06Q 30/0601* (2023.01)
- *G06F 16/9535* (2019.01)
- *G06Q 30/0201* (2023.01)
- *G06N 20/00* (2019.01)

(52) U.S. Cl.
CPC ..... *G06Q 30/0631* (2013.01); *G06F 16/9535* (2019.01); *G06N 20/00* (2019.01); *G06Q 30/0201* (2013.01); *G06Q 30/0641* (2013.01)

(58) Field of Classification Search
CPC ........... G06Q 30/0631; G06Q 30/0201; G06Q 30/0641; G06N 20/00; G06F 16/9535
USPC .................................................... 705/26, 27
See application file for complete search history.

(56) References Cited

U.S. PATENT DOCUMENTS

| | | | | |
|---|---|---|---|---|
| 7,653,761 B2 * | 1/2010 | Juster | ............... | H04N 21/44204 710/18 |
| 11,188,601 B2 * | 11/2021 | Goldberg | ............ | G06F 16/9535 |
| 2006/0212478 A1 * | 9/2006 | Plastina | ................ | G06F 16/639 |
| 2006/0265421 A1 * | 11/2006 | Ranasinghe | ............ | G06F 16/64 |
| 2007/0094066 A1 * | 4/2007 | Kumar | ............... | G06Q 30/0202 706/61 |
| 2008/0104111 A1 * | 5/2008 | Slaney | ................ | G06F 16/9535 |
| 2009/0055426 A1 * | 2/2009 | Kalasapur | ............. | G06F 16/637 |
| 2009/0056525 A1 * | 3/2009 | Oppenheimber | ..... | G06F 16/639 84/609 |
| 2009/0172538 A1 * | 7/2009 | Bates | .................... | G06F 16/639 715/706 |
| 2010/0070917 A1 * | 3/2010 | Gates | .................... | G06F 16/634 715/810 |
| 2011/0295843 A1 * | 12/2011 | Ingrassia, Jr. | ....... | G06F 16/4387 707/723 |

(Continued)

OTHER PUBLICATIONS

"How Automated Recommendations Affect the Playlist Creation Behavior of Users," Kamehkhosh et al., http://ceur-ws.org/Vol-2068/milc1.pdf; Google; 6pgs. (Year: 2018).*

*Primary Examiner* — Robert M Pond

(74) *Attorney, Agent, or Firm* — Lee & Hayes, P.C.

(57) ABSTRACT

This disclosure is directed to a system and method that generates personalized recommendations of media items for customers based on a customer's preference for familiar or novel media items. A customer can be associated with user data that can include data such as a customer's purchase data, shopping data, etc. The user data can be used to determine media item data that is associated with the customer. Based on the customer's media item data, a familiarity score can be generated that indicates a media consumption preference of the customer. Using the familiarity score, a recommendation identifying a media item can be generated for the customer.

20 Claims, 9 Drawing Sheets

(56) References Cited

U.S. PATENT DOCUMENTS

| | | | | |
|---|---|---|---|---|
| 2016/0048902 A1* | 2/2016 | Ward | ............... | G06Q 30/0631 |
| | | | | 705/26.7 |
| 2016/0132787 A1* | 5/2016 | Drevo | ............... | G06N 20/10 |
| | | | | 706/12 |
| 2017/0201576 A1* | 7/2017 | Brown | ............... | H04W 8/005 |
| 2017/0357479 A1* | 12/2017 | Shenoy | ............... | G06F 3/167 |
| 2018/0014066 A1* | 1/2018 | Berman | ............... | H04N 21/47217 |
| 2018/0246694 A1* | 8/2018 | Gibson | ............... | H04L 67/22 |

\* cited by examiner

PERSONALIZED MEDIA RECOMMENDATION SYSTEM

BACKGROUND

Users may want to receive recommendations for media items such as audio tracks, movies, electronic books (eBooks), and/or television shows. For example, a user may request to listen to audio tracks and the user may have a preference for familiar audio tracks or novel audio tracks. If the user's preference has not been identified, the user may become disappointed and/or frustrated with the experience. Additionally, identifying the user's preference can present technical challenges. For example, user data associated with multiple users can be used to generate recommendations, but the recommendations can skew toward the preferences of a majority of the users. Furthermore, a user's preference can change over time and/or based on a user's environment. Additionally, incorrectly identifying the user's preference can also result in a suboptimal user experience.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
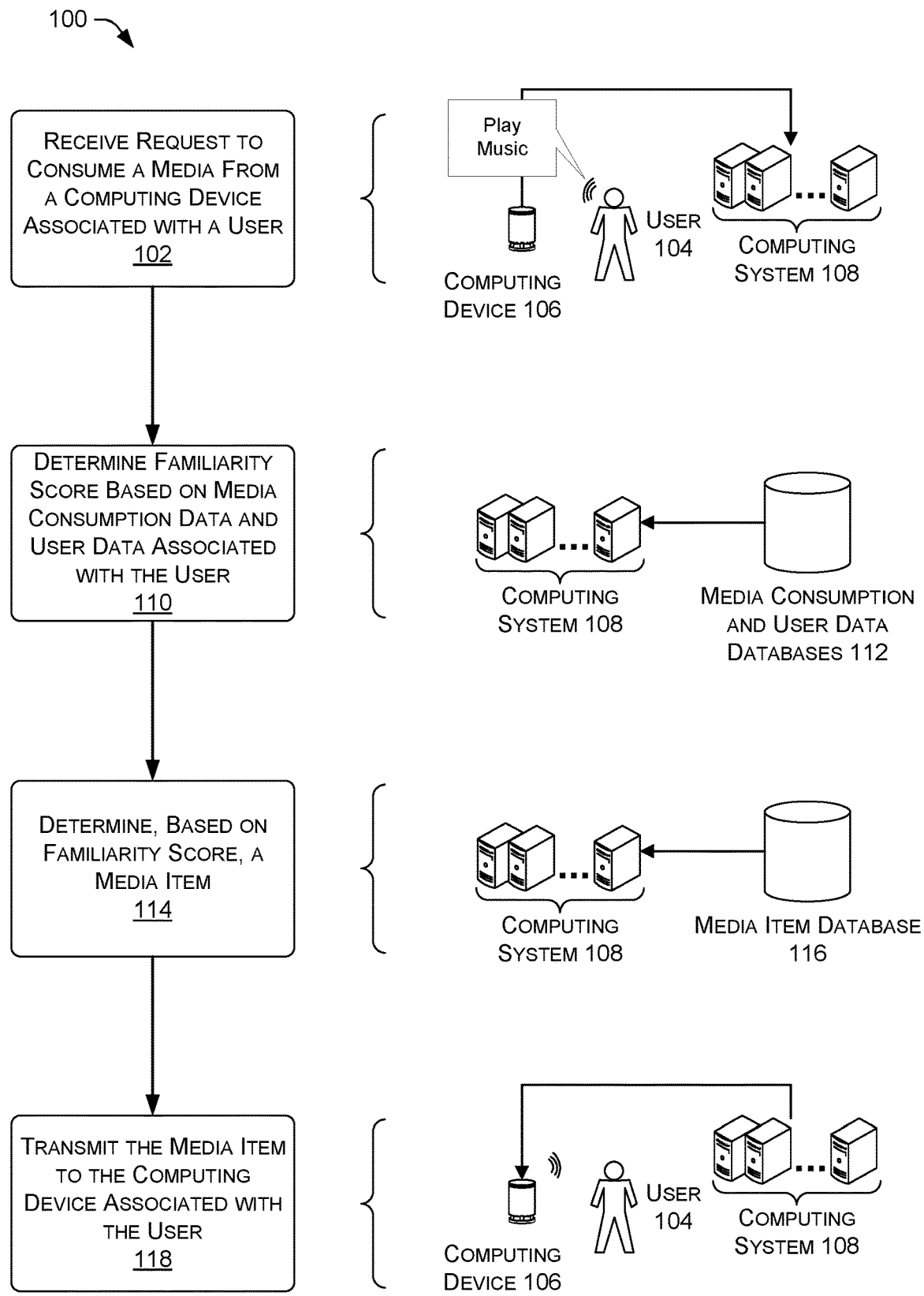
FIG. 1 is a pictorial flow diagram of an example process for determining a familiarity score and identifying a media item based on the familiarity score.

Users often desire to consume media items that correspond to their preferences. For example, a user can have a preference for listening to audio tracks that are familiar to the user (e.g., favorite songs, songs from a favorite movie, etc.). In some instances, the user can have a preference for listening to audio tracks that are novel or unfamiliar to the user (e.g., new songs from a favorite artist, recently released songs, songs from an unknown artist, etc.). Similarly, a user can have a preference for watching comedy movies or reading novels by a particular author.

A recommendation for a media item can be generated based on the user's media consumption data and/or other user data (e.g., search data, purchase data, shopping data, location data, time data, etc.). As a user consumes media items, a history of the user's consumption can be stored in a media consumption database. For example, a user can listen to audio tracks through a music playing service. Additionally, the user can select audio tracks for playback and select audio tracks that the user has already consumed. Therefore, the media consumption database can store the user's media consumption data that includes or is associated with the plurality of consumed audio tracks. The media consumption data can indicate a media consumption preference by determining an amount of familiar music that the user has consumed (e.g., repeated audio tracks) and an amount of novel or unfamiliar music that the user has consumed.

Using the user's media consumption data, a familiarity score associated with the user can be determined. The amount of familiar music con be compared with the amount of novel music to calculate a ratio. For purposes of illustration only, a user can consume 100 audio tracks where 20 of the 100 audio tracks were consumed by the user a singled time. Therefore, 80 of the 100 audio tracks were repeated at least once (i.e., were consumed two or more times). In this case, the user can have a familiarity score of 0.8 indicating that the user has a preference of listening to familiar audio tracks at a rate of 80%. However, other suitable algorithms for calculating the familiarity score are also contemplated such as normalization functions and/or logarithmic transformations.

As discussed above, a recommendation can be generated using other user data such as user activity. A user's activity can be stored in a user data database. For example, a user's activities can include browsing various web sites, making purchases, and/or traveling to various locations. In some instances, the user's activities can be stored in the user data database based on a user's preference to store the user data.

Using the user's user data, a user's preference for, for example, a genre or an artist can be determined. For example, the user data can indicate that the user frequently browses to websites associated with a particular artist. This can indicate that the user enjoys listening to music associated with the particular artist and recommendations can be generated based on this preference. Additionally, the user data can indicate a preference of the user at a particular location and/or at a particular time. For example, the user can go to a gym to exercise. Similarly, the user can exercise at various locations (e.g., go jogging outside) at a consistent time of day. While exercising, the user can have a preference for listening to a particular genre of music. A recommendation can be generated based on the user's location and/or time of day.

A recommendation model and/or algorithm, such as a machine-learning model, can be used to determine the recommended or new media item. For example, the familiarity score and/or the user data can be used as inputs into a machine-learning model such as a multi-armed bandit model. Using the familiarity score and/or the user data, the machine-learning model can determine a set of probability distributions associated with a set of media items and identify a recommended media item for the user. As the user consumes the media item, the user's current consumption (e.g., listening duration) and/or interactions (e.g., skip requests, like/dislike indications, etc.) with the media item can be used to filter and/or adjust additional recommendations made by the machine-learning model.

In some instances, the recommendation model can recommend a container associated with a set of media items for the user. For example, a music service provider can create playlists associated with an artist, a genre, and/or an era of music, among other categories. Then media items associated with the container can be recommended to the user for consumption. In some instances, the containers can be playlists generated by the user. In some instances, a threshold such as a container size threshold can be used to select containers that are associated with media items that have a minimum number of media items that meets or exceeds the container size threshold. In some instances, a container size threshold can reduce the amount of repeated media items recommended to the user by selecting containers with a larger variety of media items. In some instances, the user can adjust the container size threshold.

The recommendation model can identify a diversity media item that is inconsistent with the familiarity score associated with the user. As discussed above and for purposes of illustration only, a user can have a familiarity score of 0.8 indicating a familiarity rate preference of 80% and a novel rate preference of 20%. Therefore, based on the user's familiarity score, the user has a preference for familiar audio tracks as compared to novel audio tracks. A diversity recommendation can be generated that is based on the novel rate preference. In some instances, as discussed above, the user can consume the media item that is based on a diversity recommendation and the user's current consumption (e.g., listening duration) and/or interactions (e.g., skip requests, like/dislike indications, etc.) can be used to adjust the frequency of diversity recommendations. For example, a recommended media item consumption threshold can be used to indicate a minimum extent to which the user consumes a recommended media item.

Additionally, a user can be prompted to consume media items based on upcoming events and/or events occurring near the user. For example, a holiday can be approaching and the user can be prompted to consume audio tracks associated with the holiday. In some instances, the user can be prompted to consume media items that the user added to their library but did not consume.

A computing device can provide the prompt as an audio prompt from a speaker allowing the user to respond audibly where the user's response is captured by the computing device via a microphone. In some instances, the computing device can provide a visual prompt on a user interface of the computing device of the recommendation to consume the media item. In some instances, the user can opt into the prompts and in other instances, the user can opt out of the prompts.

The recommendation model can provide additional information associated with the recommended media item. For example, when identifying a recommended media item, the recommendation model can identify a set of reason codes associated with the recommended media item. A reason code can include, for example, that the recommended media item is similar to or is related to: another media, a genre of another media item, an artist of another media item, a mood associated with another media item, or an era associated with another media item, where the user has previously consumed the other media item.

Based on the reason code, a computing device can provide an explanation regarding the recommendation to the user. For example, prior and/or during playback of an audio track, the computing device can provide the explanation via an audio output. In some instances, the computing device can provide the explanation as a visual element in a user interface.

As discussed above, the computing device can begin playback of the media item. For example, the computing device can receive the media item from a media item database via one or more networks. In some instances, the media item can be stored locally on the computing device. In some instances, the computing device can instruct a different computing device to begin playback of the media item. For example, a first computing device can provide a user interface for the user to request a media item and the first computing device can instruct a second computing to begin playback of the media item.

The ability to generate personalized recommendations for media items presents several technical challenges. One challenge, for example, is identifying an individual user's interests and preferences. An individual user will often have interests and preferences that are unique to the individual user. Using data based on a large set of users can result in recommendations that are not aligned with the preferences of an individual user. The recommendations can skew toward the preferences of the majority of users, which can result a set of users that do not receive media item recommendations that are relevant and of interest to the set of users. For example, a media recommendation service can have millions of subscribers where a small subset of the subscribers has interests and preferences that are not consistent with the other larger subset of the subscribers. Therefore, generating recommendation based on the data of all subscribers can result in the small subset of subscribers with a poor user experience.

Another technical challenge, for example, is identifying users that have a preference for novel or unfamiliar media items and providing media item recommendations that align with the preferences of those users. For instance, a computing-based similarity model can be used to determine media items to recommend to a user. The similarity model can identify media items that are consistent with the types of media items that the user has previously consumed. However, if a user prefers to consistently consume novel media items (i.e., media items that the user has yet to consume), then the similarity model can produce suboptimal results by identifying media items that are similar to what the user has consumed instead, as opposed to identifying novel media items.

Similarly, a user's preferences can change over time and/or can change based on a user's environment. Such change can present the technical challenge of identifying media items that the user is likely to consume in view of these changes. For example, as a user ages, the user's preference in media items can change. Additionally, a user can have a media item preference based on a time of day, a day of the week, seasonal preferences, and/or location-based preference. For instance, a user may have a first media item preference while at a gym and a second media item preference that is different than the first media item preference while at home.

To address these technological problems, the personalized media recommendation system described herein can leverage a user's media consumption data to identify a user's preference for familiar or novel media items to generate a familiarity score. Using the familiarity score, as well as additional user data (e.g., search data, purchase data, shopping data, location data, time data, etc.), media items can be recommended to users with an increase in accuracy. That is, the users are more likely to be interested in, and consume, the recommended media items.

Additionally, the techniques discussed herein can improve a functioning of a computing device by decreasing the amount of computing resources consumed by generating recommendations relating to media items that a user is not likely to consume. For example, a user that receives recommendations that do not align with the user's interests will ignore the recommendations, repeatedly request a different recommendation, and/or consume media items that are different than those identified in the recommendation(s). By repeatedly requesting different recommendations, a significant amount of computing resources, such as processing resources, network activity, and power consumption, are used. Moreover, the transmission of recommendations that are not relevant to users will possibly increase latency and reduce network bandwidth. Therefore, the functioning of a computing device can be increased by reducing the resources consumed by generating and sending recommendations for media items that the user will not likely consume.

FIG. 1 is a pictorial flow diagram of an example process 100 for determining a familiarity score and determining a recommended media item based on the familiarity score. Some portions of process 100 can be omitted, replaced, and/or reordered while still providing the functionality of determining the recommended media item.

At 102, a user 104 can provide a request to play music to a computing device 106. For example, the user 104 can provide the request by audibly speaking the request within the vicinity of the computing device 106. The computing device 106 can be a voice-controlled device where the sound waves corresponding to the natural language command to "play music" can be captured by one or more microphones of the computing device 106. In some instances, the computing device 106 can be configured to identify a predefined "wake word" (i.e., a predefined utterance). Upon identifying the wake word, the computing device 106 can generate audio data associated with the natural-language command.

In some instances, the computing device 106 and/or the computing system 108 can perform the additional processing of the audio data. For example, the computing device 106 and/or the computing system 108 can use the audio data (or an audio signal that represents the audio data and that was generated by one or more microphones of the computing device 106) to perform speech recognition (e.g., automated speech recognition (ASR)) on the audio data to generate text and identify one or more user voice commands from the generated text. Additionally, the computing device 106 and/or the computing system 108 can use natural-language understanding (NLU) and/or natural-language processing (NLP) techniques to analyze the text to determine an intent (e.g., that the user has requested to consume media items) associated with the generated text (e.g., "Play music"). In some instances, in response to determining the intent, the computing device 106 and/or the computing system 108 can execute the personalized media recommendation system.

Additionally, the user 104 can provide the request to play music by interacting with a user interface such as an application executing on the computing device 106. For example, the computing device 106 can be a laptop or desktop computing device, a tablet computing device, a mobile telephone, a gaming console, an electronic book (eBook) reader device, etc. that can execute an internet browser application. The internet browser application can display a user interface for controlling playback of media items such as audio tracks. The computing device 106 can then communicate with the computing system 108 via one or more networks or, as discussed above, perform additional processing of the request locally. In some instances, the computing device 106 can be a mobile device such as a cell phone that uses a mobile application for controlling playback of media items.

At 110, the computing system 108 can access media consumption and user databases 112 to determine a familiarity score associated with the user 104. For example, the computing device 106 can be a computing device that is associated with the user 104. The user 104 can use a media playback application on a computing device such as a mobile telephone where the media playback application accesses media playback services using the user's 104 credentials. Based on the user's 104 credentials, the computing system 108 can identify a user account associated with the user 104.

In some instances, the computing device 106 can identify the user account associated with the user 104 based on the audio signal generated by the microphone(s) of the computing device 106. The computing device 106 can compare one or more characteristics of the audio signal with stored audio data stored on the computing device 106 to determine the user account. In some instances, the computing device 106 can upload the audio signal to the computing system 108 where the computing system 108 can similarly compare one or more characteristics of the audio signal with stored audio data stored on the computing system 108 to determine the user account.

Based on the user account, the computing system 108 can access media consumption and user data databases 112 associated with the user 104. As discussed above, the media consumption data and/or the user data can include media items consumed by the user 104 and/or metadata associated with the media items consumed by the user 104. Additionally, the user data can include search data, purchase data, shopping data that indicates shopping interests of the user, location data, time data, etc. The computing system 108 can use the media consumption data and the user data to determine a familiarity score associated with the user. As discussed above, the familiarity score can be determined by using, for example, a comparison of media items that the user consumed a single time and media items that the user consumed multiple times and determining, for example, a ratio that indicates the user's familiarity preference.

At 114, the computing system 108 can determine a media item from a media item database 116 to provide to the user 104. For purposes of illustration only, the familiarity score can indicate that the user has a familiarity score of 0.01 indicating that the user 104 regularly consumes media items that are novel to the user 104. For the purpose of this discussion, a novel media item with respect to a user 104 corresponds to a media item that the user 104 has yet to consume. Therefore, the computing system 108 can determine a media item that is novel to the user 104 based on the familiarity score.

At 118, the computing system 108 can transmit the media item to the computing device 106 which can begin playback of the media item for the user to consume. As discussed above, in some instances, the media item can be stored locally on the computing device 106. In other embodiments, the computing system 108 may otherwise identify, or send an indication of, the media item, such as by identifying the media item via an e-mail message, a text message, a web site, audio data outputted via one or more speakers, and so on. That is, the media item itself may be, but need not be, transmitted to the computing device 106 of the user 104.

Figure 2:
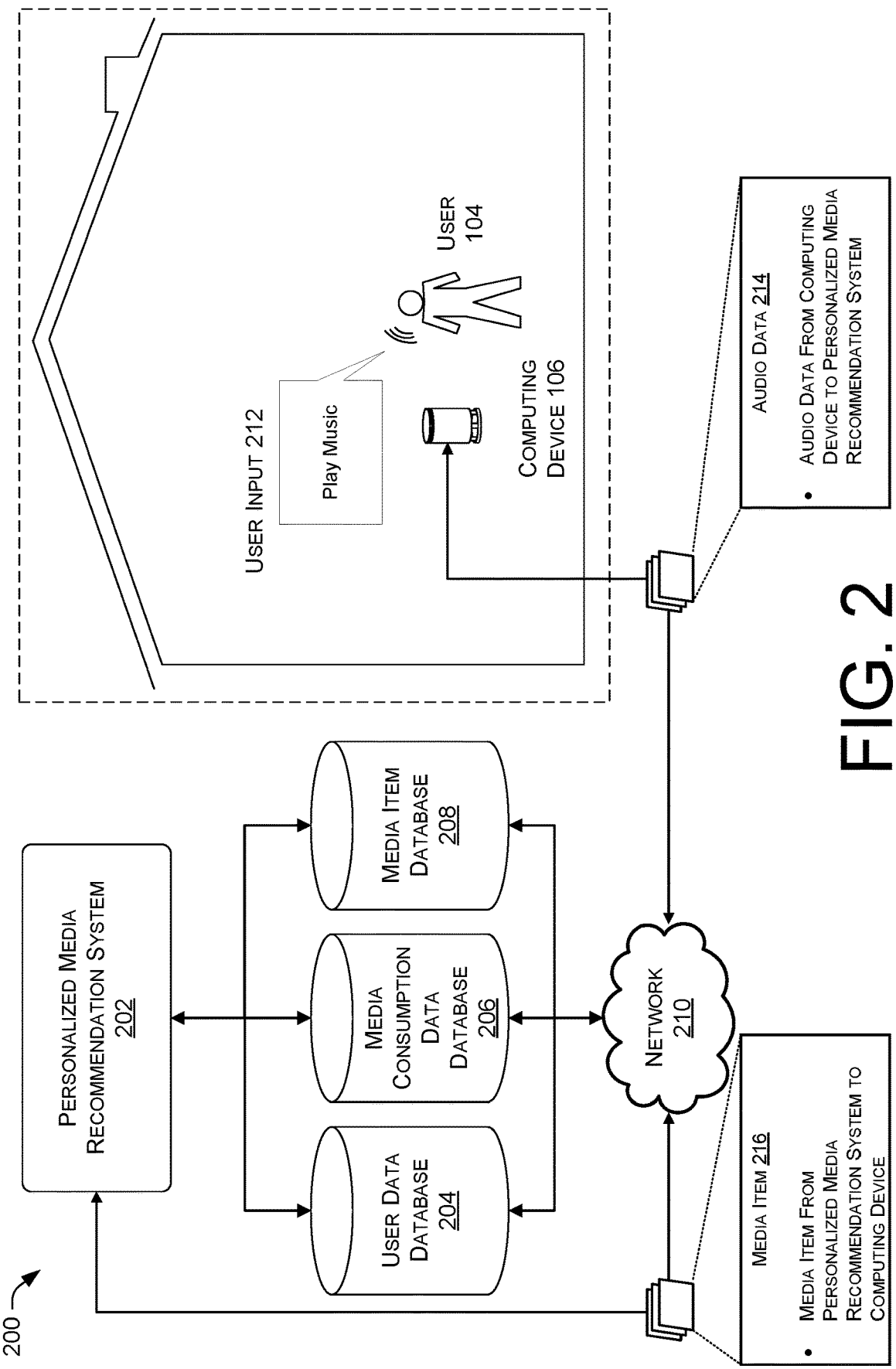
FIG. 2 is a pictorial diagram of an illustrative environment that includes an illustrative personalized media item recommendation generation system.

FIG. 2 is a system diagram of an illustrative environment 200 that includes a personalized media recommendation system 202, a user data database 204, a media consumption data database 206, a media item database 208, and the computing device 106. The elements of FIG. 2 can be substantially similar to the elements of FIG. 1 that share the same name.

As depicted in FIG. 2, the computing device 106 can be coupled to the personalized media recommendation system 202, the user data database 204, the media consumption data database 206, and the media item database 208 via network 210.

The user data database 204 can store user data corresponding to or associated with one or more users. For example, a user can create an account with a service and provide information such as age, gender, geographic region, language preferences, and/or personal interests as well as other information. The user data database 204 can also store user preferences associated with the user. For example, the user data database 204 can store user preferences, such a frequency regarding the generation of recommendations, a time at which recommendations are to be generated, types of recommendations that are to be generated, and/or which devices or type of devices are to receive recommendations. The user data database 204 can store this user data and provide access to this user data to the personalized media recommendation system 202, the media consumption data database 206, and/or the media item database 208 through a direct connection and/or through a network 210.

As discussed above, the user data database 204 can also store the user's 104 activity data such as browsing data indicating websites/webpages that the user 104 browses (and/or items that the user 104 has viewed or selected, search data that indicates items that the user 104 has previously searched for, queue data indicating media items that the user 104 has queued to consume (e.g., a watch list), such as in a playlist or in a reading list, purchase data indicating purchases made by the user 104, and/or travel data indicating locations where the user 104 has traveled or is scheduled to travel.

The media consumption data database 206 can include media consumption data indicating media items that the user 104 has consumed and/or media consumption data indicating media that the user 104 is currently consuming. Additionally, the media consumption data can indicate media items that the user 104 has partially consumed as well as interactions with the media items such as skip requests, and/or indications that the user liked the media item or dislike the media item.

The media item database 208 can store media items including, but not limited to, television episodes, a television series, motion pictures and/or movies, movie clips, movie trailers, books, eBooks, and audio recordings, such as songs, music albums, podcasts or audiobooks. In some instances, the media items can be a part of a regularly occurring series, such as a television series or a weekly podcast. In other instances, the media items can be a part of a non-regularly occurring series such, as a set of motion pictures. In some instances, the media item database 208 can store a buffer of a live event in the form of a video stream, an audio stream, or a recording of a live event.

The user data database 204, the media consumption data database 206, and the media item database 2086 can be combined and/or can have shared resources. For example, the user data database 204, the media consumption data database 206, and the media item database 208 can all be in the same physical location and/or in the same logical entity that is distributed across multiple hardware instances such as, for example, a distributed computing platform. As depicted, the personalized media recommendation system 202 can connect directly to the user data database 204, the media consumption data database 206, and the media item database 208. In some instances, the personalized media recommendation system 202 can connect to the databases 204, 206, and 208 through one or more computing systems and/or the network 210. In some instances, the personalized media recommendation system 202 can be located within one, some, or all of the databases 204, 206, and 208 and/or computing device 106. These examples show how a variety of architectures can be used to implement these systems.

The user 104 can provide user input 212 that includes a request to, for example, play music. As discussed above, computing device 106 can be equipped with one or more microphones to capture the user input 212. The computing device 106 can, based on the user input 212, generate the audio data 214 and transmit the audio data 214 to the personalized media recommendation system 202. In some instances, the audio data can include a digital representation of user input 212. In some instances, the computing device 106 can perform processing actions on the user input 212 and associate the audio data 214 with the user 104 and a user profile associated with the user 104.

The computing device 106 can transmit the audio data 214 to the personalized media recommendation system 202 via network 210. After receiving the audio data 214, the personalized media recommendation system 202 can access the media consumption data database 206 to determine the familiarity data associated with the user 104. As discussed above, the personalized media recommendation system 202 can compare consumed media items associated with the user 104 and determine media items that the user 104 consumed a single time as well as media items that the user 104 consumed multiple times. Based on the familiarity data, the personalized media recommendation system 202 can determine a familiarity score as a ratio of media items that the user 104 consumed multiple times to the total number of media items that the user 104 has consumed.

Additionally, the personalized media recommendation system 202 can access the user data database 204 to determine additional preferences of the user 104. For example, the personalized media recommendation system 202 can use the user data to determine that the user 104 frequently purchases music associated with a particular artist.

Based on the user data and the media consumption data, the personalized media recommendation system 202 can access the media item database 208 to identify the media item 216 and transmit the media item 216 to the computing device 106 via the network 210.

Figure 3:
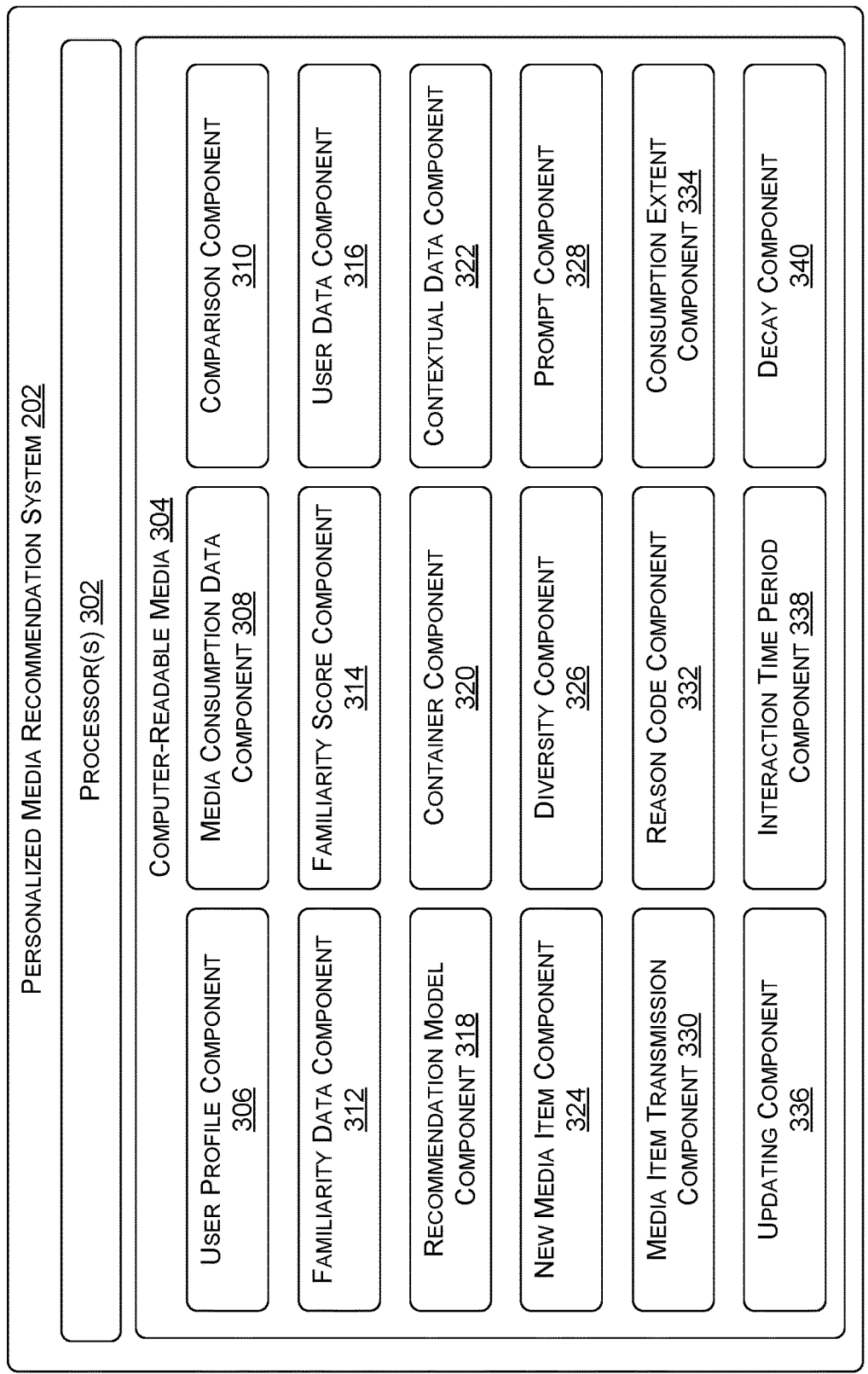
FIG. 3 is a system diagram of an illustrative environment that includes an illustrative computing architecture of the personalized media recommendation system of FIG. 2.

FIG. 3 is an illustrative computer architecture 300 of the personalized media recommendation system 202. The elements of FIG. 3 can be substantially similar to the elements of FIG. 2 that share the same name.

The personalized media recommendation system 202 can be implemented in a distributed or non-distributed computing environment. For example, some of the components can be distributed across multiple computing platforms or all of the components can be consolidated onto a single computing platform. Additionally, some of the components can be duplicated and implemented in parallel.

The personalized media recommendation system 202 can include one or more processors 302 and one or more computer readable media 304 that stores various modules, applications, programs, or other data. The computer-readable media 304 can also include instructions, that when executed by the one or more processors 302, cause the one or more processors 302 to perform the operations described herein for the personalized media recommendation system 202. In some instances, the processor(s) 302 can include a central processing unit (CPU), a graphics processing unit (GPU), both a CPU and a GPU, or other processing units or components known in the art. Additionally, each of the processor(s) 302 can possess its own local memory, which also may store program modules, program data, and/or one or more operating systems.

The computer-readable media 304 can be provided as a computer program product including a non-transitory machine-readable storage medium having stored thereon instructions (in compressed or uncompressed form) that can be used to program a computer (or other electronic device) to perform processes or methods described herein. The machine-readable storage medium can include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. The computer-readable media 304 can also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

The computer-readable media 304 can store a user profile component 306, a media consumption data component 308, a comparison component 310, a familiarity data component 312, a familiarity score component 314, a user data component 316, a recommendation model component 318, a container component 320, a contextual data component 322, a new media item component 324, a diversity component 326, a prompt component 328, a media item transmission component 330, a reason code component 332, a consumption extent component 334, an updating component 336, an interaction time period component 338, and a decay component 340.

The personalized media recommendation system 202 can receive the audio data 214 from the computing device 106 of FIG. 2 at the user profile component 306. The user profile component 306 can use the audio data 214 to determine a user profile associated with the audio data 214 and user 104. As discussed above, the user profile component 306 can compare one or more characteristics of the audio signal in the audio data 214 with stored audio data that is stored in the user profile component 306. In some instances, the user data database 204 can store the stored audio data and the user profile component can access the stored audio data in the user data database 204 to perform the comparison.

Using the user profile identified by the user profile component 306, the media consumption data component 308 can access media consumption data associated with the user 104 in the media consumption data database 206. In some instances, the media consumption data database 206 can transmit the media consumption data to the media consumption data component 308 directly or via the network 210. In some instances, the media consumption data component 308 can determine which media consumption data to retrieve and then the media consumption data component 308 can retrieve the media consumption data from the media consumption data database 206. In some instances, the personalized media recommendation system 202 can access the media consumption data without the media consumption data component 308 by, for example, having the media consumption data stored within the computer-readable media 304 or, for example, by having the personalized media recommendation system 202 operate within the media consumption data database 206. In some instances, a new user may not have a significant amount of media consumption data available to make recommendations. The media consumption data component 308 can include a consumed media items threshold, such as a consumed audio tracks threshold. The media consumption data component 308 can indicate that the media consumption data associated with the user meets or exceeds the consumed media items threshold and, based on this indication, the personalized media recommendation system 202 can proceed to identify media items to recommend to the user.

The comparison component 310 can use the media consumption data to determine media items that the user 104 has consumed multiple times as well as media items that the user 104 has consumed a single time. For example, the comparison component 310 can identify a first media item that the user 104 has consumed. Then the comparison component 310 can compare the first media item with other media items identified in the media consumption data. For example, the comparison component 310 can compare a file name of the first media item with file names of other media items associated with the media consumption data to determine if the user has consumed the first media item multiple times. In some instances, the comparison component 310 can compare metadata such as identifying tags of the first media item and the other media items. In some instances, the comparison component 310 can compare audio frequency data (e.g., spectrogram data) of the first media item with the other media items.

The familiarity data component 312 can use the comparison component 310 to determine the amount of media items that the user 104 has consumed multiple times. For example, the familiarity data component 312 can determine familiarity data that tracks the number of times that the user 104 has repeated a particular media item using, for example a repeat counter. For purposes of illustration only, the familiarity data component 312 can identify the first media item and use the comparison component 310 to compare the first media item with the other media items that the user 104 has consumed. If the comparison component 310 identifies another media item that is the same and/or corresponds to the first media item, then the familiarity data component 312 can increment a counter. The familiarity data component 312 can also track the extent to which the user 104 consumed each media item. For purposes of illustration only, the familiarity data can indicate that the user 104 consumed the first media item 2.5 times which indicates that the user 104 completed the first media item twice and completed half of the first media item on a third occasion. In some instances, the familiarity data can include a repeat frequency associated with a track, an artist, and/or a genre.

The familiarity score component 314 can use the familiarity data generated by the familiarity data component 312 to determine a familiarity score associated with the user 104. As discussed above, the familiarity score component 314 can determine a number of repeated media items as well as a number of non-repeated media items associated with the media consumption data. Using the number of repeated media items, the familiarity score component 314 can determine a familiarity score associated with the user 104 as a ratio of repeated media items to total media items consumed by the user 104. In some instances, the media consumption data can identify an artist and/or a genre, among other categories, associated with the consumed media items. The familiarity score component 314 can generate an artist familiarity score and/or a genre familiarity score in addition to, or alternatively to, the overall familiarity score. For purposes of illustration only, if the user 104 consumed a first media item once and a second media item twice, the familiarity score can be represented as 0.5 because the user 104 consumed the second media item more than once and consumed a total of two unique media items. In some instances, the familiarity score component 314 can use a weighted average to determine the familiarity score. For purposes of illustration only, and in the above example, the familiarity score can be represented as 0.66 because the user 104 consumed the second media item twice and consumed a total number of three media items (i.e., the first media item and the second media item twice). Therefore, the familiarity score component 314 can determine the familiarity score as a simple ratio or as a weighted average, although other suitable algorithms are also contemplated.

The familiarity score component 314 can use normalization functions to determine a familiarity score for the user 104. For example, the familiarity score component 314 can determine familiar scores for other users. In some instances, the other users can be all other users of a media service provider. In some instances, the other users can be users that share interests, geographic locations, and/or other contextual data with the user. Then, the familiarity score component 314 can scale the familiarity scores associated with the other users such that a portion favors familiar media items and a different portion does not favor familiar media items where the portions can be, for example one half or approximately one half of the other users. The familiarity score component 314 can then normalize the user's 104 familiarity score according to the scale of familiarity scores associated with the other users. By scaling the familiarity scores of the other users and normalizing the user's 104 familiarity score, a skew toward high familiarity can be corrected. For purposes of illustration only, a first user can have a familiarity score of 0.6 and a second user can have a familiarity score of 0.9. The familiarity score component can scale the scores such that the lowest familiarity score (i.e., 0.6) can be scaled to 0.0 and the highest familiarity score (i.e., 0.9) can be scaled to 10. Then, familiarity score component 314 can determine that the user 104 has an unnormalized familiarity score of 0.7 and normalize the familiarity score to 0.333 using a linear normalization function. In some instances, non-linear normalization functions can be used.

The familiarity score component 314 can determine a familiarity score associated with the user 104 on a periodic basis. For example, as the user 104 consumes media items, the user's 104 media preferences can change. The familiarity score component 314 can be configured to determine the familiarity score associated with the user 104 on a periodic basis (e.g., on a monthly basis, on a weekly basis, on a daily basis, on an hourly basis, etc.). In some instances, the familiarity score component 314 can determine updates associated with the media consumption data and/or the user data associated with the user 104. Based on the updates, the familiarity score component 314 can determine an updated familiarity score.

The user data database 204 can transmit user data to the user data component 316 directly or via the network 210. In some instances, the user data component 316 can determine which user data to retrieve and then the user data input component 316 can retrieve the user data from the user data database 204. In some instances, the personalized media recommendation system 202 can access the user data without the user data input component 316, for example, by having the user data stored within the computer-readable media 304 or, for example, by having the personalized media recommendation system 202 operate within the user data database 204.

The recommendation model component 318 can use the familiarity score as well as the user data to determine a media item to recommend to the user 104. For example, the recommendation model component 318 can rank media items in the media item database 208 according to a likelihood of a match with the user's preference. For purposes of illustration only, the user 104 can have a familiarity score of 0.8. Additionally, the user 104 can have shown an interest in music by a particular music artist based on the user's purchase data of books related to the music artist. The media item database 208 can have a first media item that the user 104 has already consumed by a different music artist as well as a second media item that the user 104 has already consumed by the particular music artist. Because the user's 104 interests align more with the particular music artist, the second media item would receive a higher rank than the first media item and the recommendation model component 318 can identify the second media item as the recommended media item.

As discussed above, in some instances, the recommendation model component 318 can use a machine-learning model such as a multi-armed bandit model to identify recommended media items, although other suitable algorithms, techniques, and machine-learning models are contemplated such as, for example, contextual multi-armed bandit models, binary multi-armed bandit models, Bernoulli multi-armed bandit models, Marvok machines, and/or the use of strategies such as an epsilon-greedy strategy, an epsilon-first strategy, an epsilon-decreasing strategy, an adaptive epsilon-greedy strategy based on value differences, and/or a contextual epsilon-greedy strategy.

The container component 320 can provide to the recommendation model component 318 containers to recommend to the user 104. For example, a container can contain a set of media items. In some instances, the container is a playlist generated by a music services provider. In some instances, the container is a playlist generated by the user 104. The container component 320 can provide the containers to the recommendation model component 318 and the recommendation model component 318 can identify a particular container to recommend for the user 104. The recommendation model component 318 can then identify a random media item associated with the particular container or further identify a media item that is more likely to align with the user's 104 preferences as compared to other media items associated with the container.

The contextual data component 322 can provide contextual data to the recommendation model component 318 to allow the recommendation model component 318 to identify media items that are further likely to align with the user's 104 preferences. For example, the contextual data component 322 can determine the user's 104 current location and/or current time. Additionally, the contextual data component can access the user data database 204 to identify trends and/or preferences associated with the user 104 and determine a contextual similarity (e.g., a time similarity and/or a location similarity). As discussed above and for illustration purposes only, the user 104 can periodically go to a gym to exercise. The user data can indicate that the user 104 consumes fast-paced music while exercising. The contextual data component 322 can then identify that the user 104, based on the current location data, that the user is at the gym and indicate to the recommendation model component 318 that the user 104 may have a preference for fast-paced music. The recommendation model component 318 can then assign a weight and/or significance to this indication and provide a recommended media item to the user 104 while the user is at the gym. Similarly, and for purposes of illustration only, the user 104 might go running at 6 P.M. periodically and have a similar preference for fast-paced music while running. The contextual data component 322 can identify that the user is likely to be running based on the current time data and provide this indication to the recommendation model component 318.

The new media item component 324 can identify new media items that the user 104 has yet to consume and may or may be aware of its availability. For example, based on the media consumption data and the user data associated with the use 104, the new media item component 324 can determine that the user 104 has an interest in a particular music artist. For purposes of illustration only, the new media item component 324 can identify a new album released by the particular music artist. Because the album is a new album, the user 104 might not be aware that the album is available. The new media item component 324 can indicate to the recommendation model component 318 that the album is available and the recommendation model component 318 can provide the album and/or audio tracks associated with the album to the user 104 to consume. In some instance, the new media item component 324 can use a media item release threshold such that new media items that are older than the media item release threshold are not indicated by the new media item component 324 to the recommendation model component 318. In some instances, the user 104 can adjust the media item release threshold.

The diversity component 326 can identify media items that the user 104 may have a preference to consume but does not correspond to the familiarity score. For purposes of illustration only, the user 104 can have a classical music genre familiarity score of 0.9 indicating that the user regularly listens to classical music. The diversity component 326 can identify media items that are related to classical music but not strictly within the classical music genre. For example, genres of music can be mapped onto a spectrum where genres with more similarity are closer together than genres with less similarity. The diversity component 326 can identify genres with similarity to classical music and identify media items within that genre. Additionally, the diversity component 326 can identify a rate at which to introduce a diversity media item recommendation to the user 104. For purposes of illustration only, the diversity component 326 can use a rate of 1 media item recommendation per 100 media item recommendations to introduce a diversity media item recommendation. In some instances, the user 104 can interact with the diversity media item recommendation (e.g., consuming the entire diversity media item recommendation, skipping the diversity media item recommendation, requesting a different recommendation, etc.) and the diversity component 326 can adjust the rate of introducing diversity media item recommendations based on the user's 104 interaction. In some instances, the user 104 can adjust the frequency that the diversity component 326 introduces a diversity media item recommendation. Additionally, in some instances the user 104 can adjust a relatedness of diversity media item recommendations where a closer relatedness indicates that the diversity component 326 would introduce diversity media item recommendations that are closely related to the user's 104 preferences and vice versa.

The prompt component 328 can identify media items based on upcoming events and/or events occurring near the user 104. As discussed above, a holiday can be approaching and the prompt component 328 can generate a prompt for the user 104 to consume audio tracks associated with the holiday. In some instances, a concert event associated with an artist that the user has an interest in can be approaching and the prompt component 328 can generate a prompt and transmit the prompt to a computing device associated with the user 104. In some instances, the prompt component 328 can generate a prompt for the user 104 to choose a media item to consume. For example, the prompt can recommend a first audio track and a second audio track. The user can respond by selecting one of the first audio track or the second audio track. In some instances, the first audio track can have different characteristics from the second audio track and the user selection can be tracked and/or stored in the media consumption data associated with the user.

The prompt can allow a user 104 to dismiss the prompt, to cause the prompt to be presented at a later time (e.g., "snooze" the prompt), to begin consuming the media item, or to queue the media item so that the user 104 can consume the media item at a later time. In some instances, the notification can allow a user 104 to consume the media item on a separate device. For example, the prompt can arrive on a first computing device (e.g., a mobile telephone) and the user 104 can interact with the prompt by selecting a second computing device (e.g., a television, an eBook reader device, a tablet computing device, etc.) to be used to begin consuming the media item. In some instances, the prompt can be a chime generated by a device associated with the user and/or an audio message. For example, a computing device with a speaker can make a sound and/or an announcement of a recommendation of a media item. In some instances, the prompt can be based on a type of user interface and/or a type of device that will receive the notification. In some instances, a combination of types of prompts can be generated. The prompt component 328 can determine the types of user interfaces and/or devices associated with the user 104 and generate prompts applicable to the user interfaces and/or devices that will receive the prompt.

The media item transmission component 330 can transmit, via the network 210, the media item to a user interface and/or device associated with the user 104. For example, the media item transmission component 330 can request the media item from the media item database 208. In some instances, the media item transmission component 330 can receive the media item. In some instances, the media item transmission component 330 can transmit instructions that cause the media item database 208 to transmit the media item to the user interface and/or device associated with the user 104. In some instances, the media item transmission component 330 can direct the user interface and/or device associated with the user to request the media item from the media item database 208.

In some instances, the media item transmission component 330 can transmit the media item based on an action taken by the user 104. For example, the user 104 can receive the prompt of the media item and take an action that indicates that the user 104 would like to consume the media item. In some instances, the user 104 can receive the prompt of the media item and, based on a timeout and/or a prompt time threshold, transmit the media item to the user interface and/or device associated with the user 104. Although the media item itself may be transmitted to the user 104, it is also contemplated that information associated with the media item may be transmitted, or provided to, the user 104.

The reason code component 332 can provide additional information associated with the recommended media item. As discussed above, the reason code component 332 can identify a set of codes associated with media item that is recommended by the recommendation model component 318. A reason code can include, for example, that the recommended media item is similar to or is related to: another media, a genre of another media item, an artist of another media item, a mood associated with another media item, or an era associated with another media item, where the user has previously consumed the other media item. The reason code component 332 can then generate an explanation associated with the recommended media item based on the reason code(s). Prior and/or while the user 104 consumes the media item, the reason code component 332 can provide the explanation to a computing device associated with the user 104. Similar to the prompt component 328, the reason code component 332 can provide a visual indication and/or an audio notification of the explanation on a user interface of a computing device associated with the user.

The consumption extent component 334 can identify an extent to which the user 104 has consumed the recommended media item. For example, the user can consume the entirety of the recommended media item, a portion of the recommended media item, as well as none of the recommended media item. The consumption extent component 334 can also identify at what point or how quickly the user 104, for example, skips the recommended media item and/or requests a different recommendation. For purposes of illustration only, the user 104 can skip a first recommended audio track after consuming the first audio track for 2 seconds and can skip a second recommended audio track after consuming the second audio track for 2 minutes. The consumption extent component 334 can associate the corresponding user's 104 interaction of the first audio track and the second audio track.

The consumption extent component 334 can transmit the extent to which the user 104 has consumed the recommended media item to the familiarity score component 314 which can indicate to the familiarity score component 314 to determine a new familiarity score associated with the user 104. For purposes of illustration only, the user 104 can consume a portion of a recommended media item that is a familiar media item. Then, the user 104 can indicate that the user would like to consume a different media item by skipping the recommended media item. The consumption extent component 334 can indicate to the familiarity score component 314 that the user skipped the recommended media item. Based on this indication that the user 104 skipped a familiar media item, the familiarity score component 314 can determine a new familiarity score associated with the user 104.

The updating component 336 can use the interactions identified by the consumption extent component 334 and update the media consumption data associated with the user 104 in the media consumption data database 206. The user's 104 interactions can then be used by the recommendation model component 318 and/or the familiarity data component 312 to provide media items that further align with the user's 104 preferences.

The interaction time period component 338 identifies media items that the user 104 has not interacted with over a period of time. For example, the user 104 can consume a media item in the past and has not produced any activity corresponding to the media item (e.g., consuming the media item, adding the media item to a playlist, etc.). The interaction time period component 338 can identify these media items and indicate to the recommendation model component 318 that the user 104 has not consumed these media items for a particular duration of time. The recommendation model component 318 can then determine that the media items align with the user's 104 preferences (e.g., based on the familiarity score and/or the user data) and provide the media items for the user 104 to consume. The interaction time period component can allow the user 104 to consume media items that align with the user's interests while still providing varied media item recommendations. In some instances, the user 104 can adjust a recently consumed threshold where the interaction time period component 338 identifies media items that meet or exceed the recently consumed threshold.

The decay component 340 identifies media items and/or user data that meets or exceeds a decay threshold and can discard, disassociate, and/or delete portions of the user data and/or media items. In some instances, the decay component 340 can associate an expiration tag with the portions of the user data and/or the media item and the recommendation model component 318 can use the expiration tag to determine that the portion of the user data and/or the media item should not be used to generate a recommendation. For example, the decay component 340 can be configured to identify media items and/or user data that meets or exceeds a decay threshold. By discarding, disassociating, and/or deleting the media items and/or portions of the user data that meet or exceed the decay threshold, the familiarity data component 312 and the recommendation model component 318 can be optimized to use the most relevant and/or up-to-date data. In some instances, the user 104 can adjust the decay threshold.

As discussed above, the user can adjust settings, preferences, and/or threshold associated with various features of the personalized media recommendation system 202. For example, a user can adjust a container size threshold that indicates the minimum size of a container, a media item release threshold that indicates a time period for identifying newly released media items, a diversity frequency that indicates how often the user receives diversity media item recommendations, a diversity relatedness that indicates how similar a diversity media item recommendation is to the user's preferences, a recently consumed threshold indicating a time period before recommending media items that the user has interacted with in the past, and a decay threshold indicating a time period before discarding and/or deleting media items and/or user data. In some instances, the personalized media recommendation system 202 can provide a user interface that comprises a dashboard allowing the user the adjust and/or control these settings and preferences in one location. In some instances, the dashboard can be displayed on an interface such as an internet browser. In some instances, the dashboard can be displayed on an interface such as an application on a mobile device such as a tablet computer and/or a cell phone. In some instances, the dashboard can allow the user to request to turn off certain types of recommendations. For purposes of illustration only, the user can adjust a setting such that the personalized media recommendation system 202 does not generate any diversity media item recommendations or that the personalized media recommendation system 202 does not use contextual data (e.g., location data, time data, etc.) to generate media item recommendations.

Figure 4:
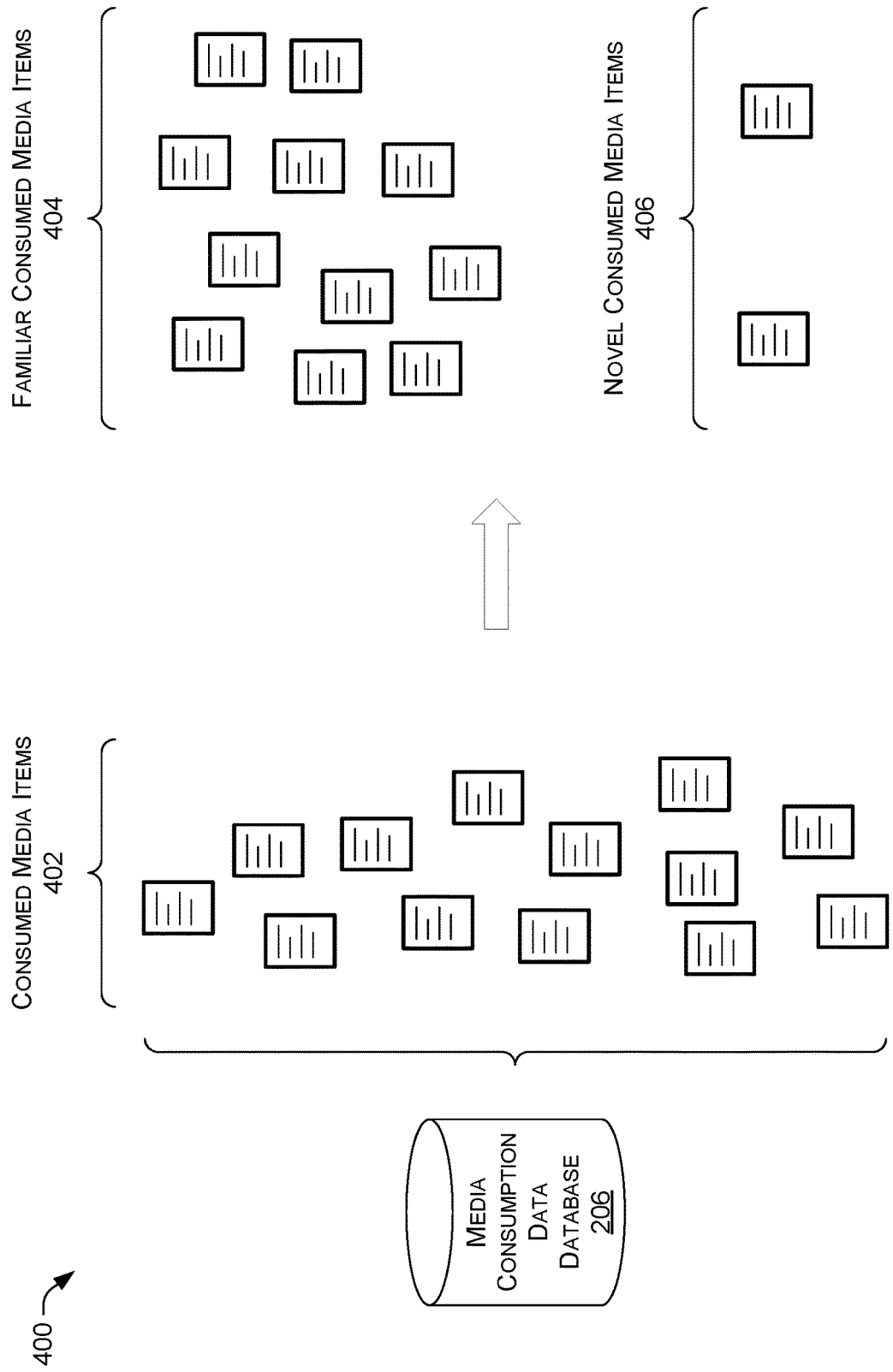
FIG. 4 is a pictorial diagram of illustrative consumed media items with familiar and novel consumed media items of the consumed media items.

FIG. 4 is a pictorial diagram of illustrative consumed media items and identifying familiar consumed media items and novel consumed media items. The elements of FIG. 4 can be substantially similar to the elements of FIG. 2 that share the same name.

As discussed above, the media consumption data database 206 can include media consumption data indicating the consumed media items associated with user 104. The comparison component 310 of FIG. 3 can use the consumed media items 402 to identify familiar consumed media items 404 that the user 104 has consumed more than once and novel consumed media items 406 that the user 104 has consumed once. Based on the identification of familiar consumed media items 404 and novel consumed media items 406, the familiarity score component 314 can determine a familiarity score associated with the user 104. As discussed above, the familiarity score component 314 can use a simple ratio, a weighted average, or other suitable techniques and/or algorithms to determine the familiarity score.

Figure 5:
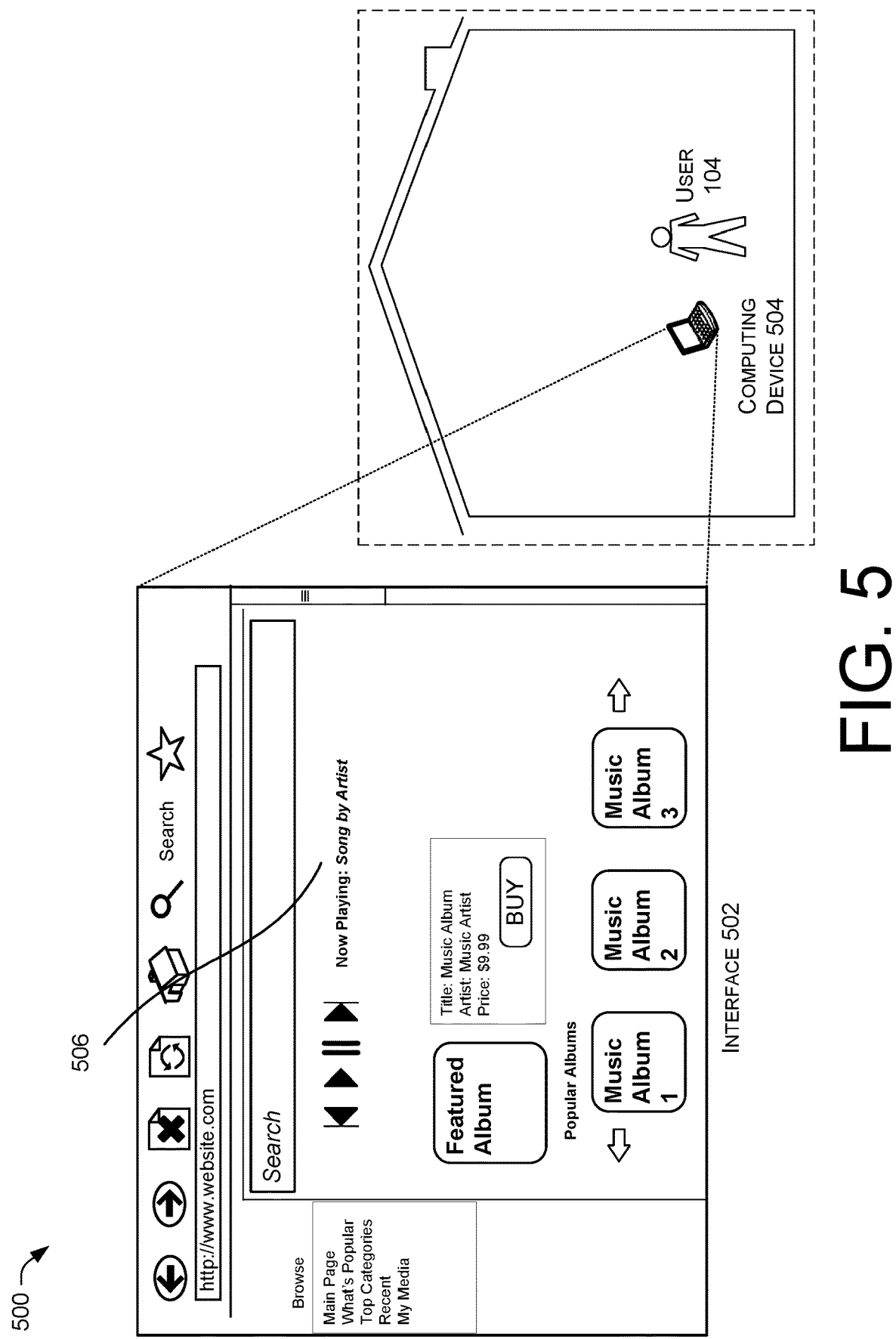
FIG. 5 is a pictorial diagram of an illustrative user interface on an illustrative computing device.

FIG. 5 is a pictorial diagram 500 of an interface 502 such as in an internet browser that can be displayed on a device such as computing device 504 that is associated with user 104. The interface 502 an indication 506 of, for example, music that is currently playing and allow the user 104 to play, pause, skip, and/or go to a previous audio track. Additionally, the interface 502 can display featured albums and/or popular albums based on recommendations identified by the recommendation model component 318.

Figure 6A:
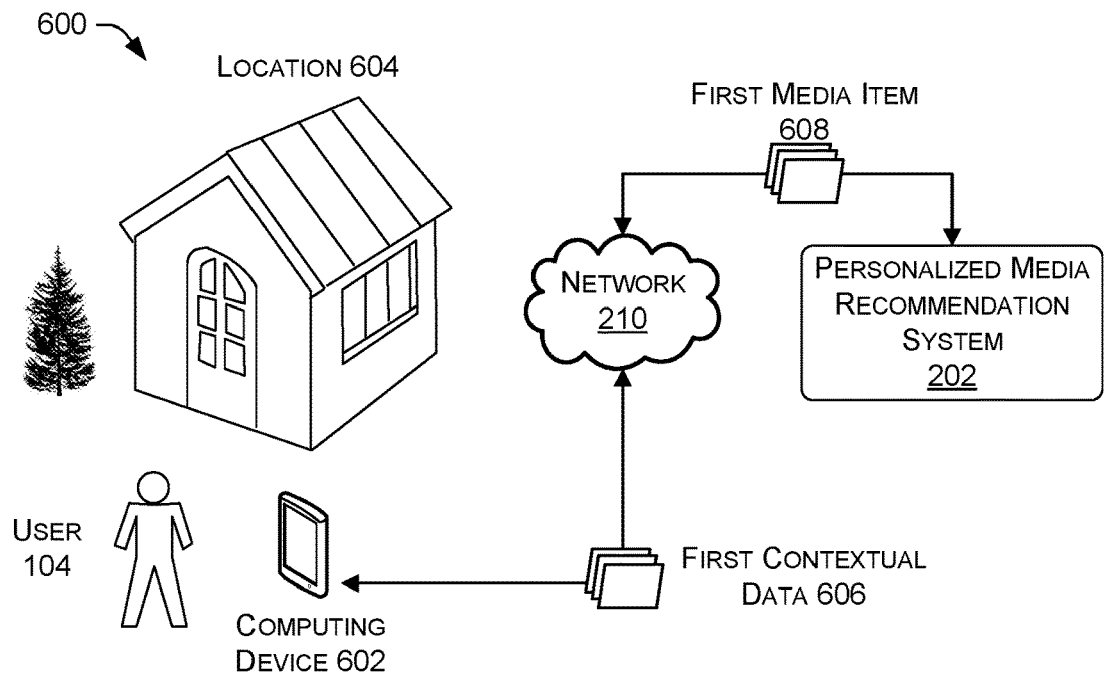
FIG. 6A is a pictorial diagram of the personalized media recommendation system of FIG. 2 using first contextual data to recommend a first media item.

FIG. 6A is a pictorial diagram 600 of user 104 using computing device 602 at location 604. The elements of FIG. 6A can be substantially similar to the elements of FIG. 2 that share the same name.

The location 604 can, for purposes of illustration only, represent a home of user 104. As user 104 uses the computing device 602 at location 604, the computing device 602 can transmit first contextual data 606 to the personalized media recommendation system via network 210. The first contextual data 606 can correspond to and/or identify location 604. Using the first contextual data 606, the familiarity score associated with the user, and the user data, the personalized media recommendation system 202 can identify a first media item 608 that corresponds to the user's 104 preferences associated with location 604. Other contextual data, such as time of day, day of the week, time of year, an activity level of the user 104 (e.g., determined via an activity tracker, such as a smart watch), etc. may also be considered when identifying and/or recommending media items for consumption by the user 104.

Figure 6B:
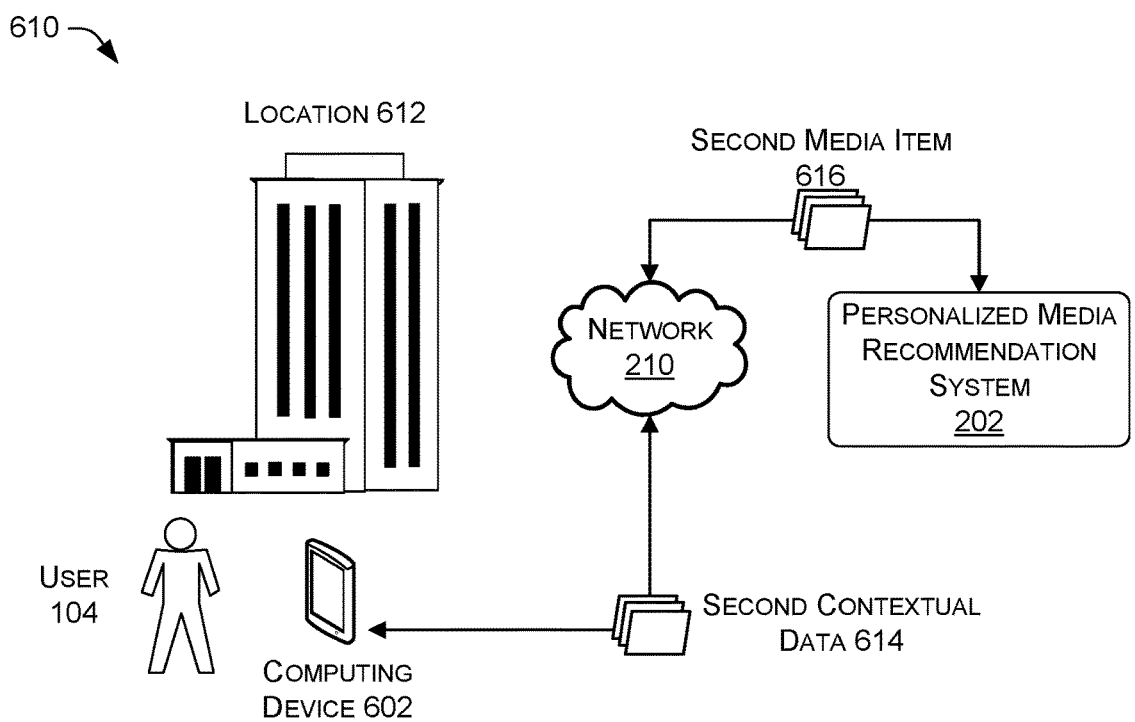
FIG. 6B is a pictorial diagram of the personalized media recommendation system of FIG. 2 using second contextual data to recommend a second media item.

FIG. 6B is a pictorial diagram 610 of the user 104 using the computing device 602 of FIG. 6A at a location 612. The elements of FIG. 6A can be substantially similar to the elements of FIG. 2 that share the same name.

The location 612 can, for purposes of illustration only, represent a workplace of user 104. The computing device 602 can transmit second contextual data to the personalized media recommendation system via network 210. The second contextual data 612 can correspond to and/or identify location 612. As discussed with reference to FIG. 6A, using the second contextual data 614, the familiarity score associated with the user, and the user data, the personalized media recommendation system 202 can identify a second media item 616 that corresponds to the user's 104 preferences associated with location 612.

Figure 7A:
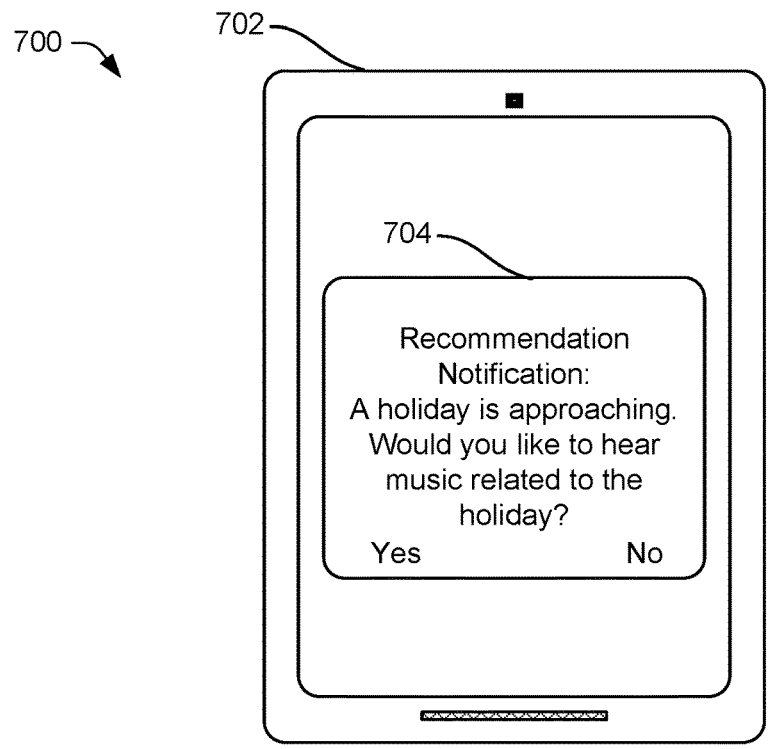
FIG. 7A is a pictorial diagram of a notification of a media item recommendation on an illustrative computing device.

FIG. 7A is a pictorial diagram 700 of a computing device 702. The prompt component 328 can generate a prompt 704. As discussed above, the prompt can be based on an upcoming holiday and the user can interact with the prompt by selecting, for example, "Yes" or "No," or other user interface elements that indicate a user selection such as a check mark. As discussed above, the prompt component 328 can also, or alternatively, generate an audio message that reads out the contents of the prompt 704.

Figure 7B:
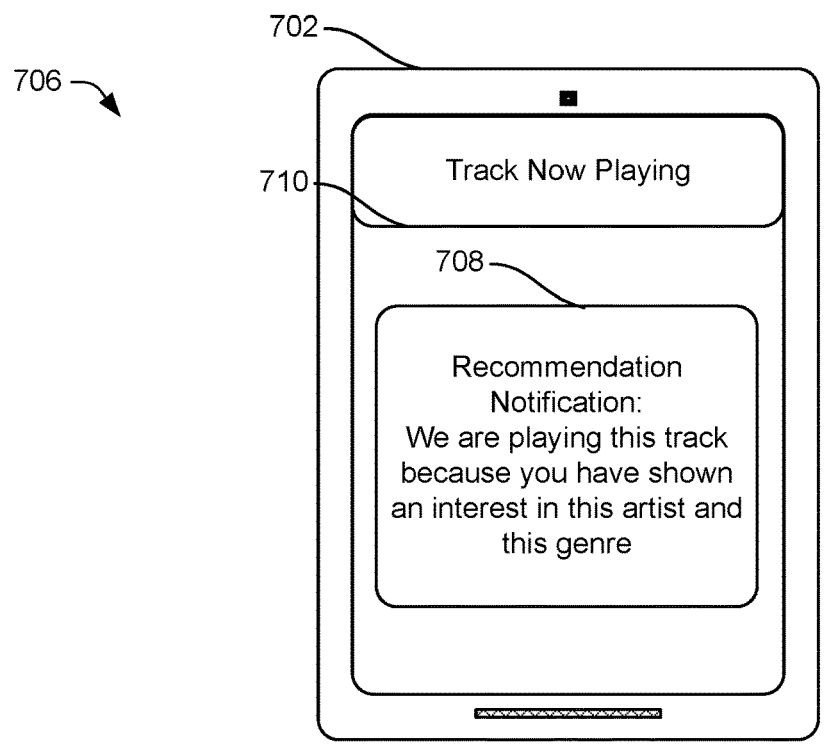
FIG. 7B is a pictorial diagram of the illustrative computing device of FIG. 7A playing a media item and a recommendation explanation associated with the media item.

FIG. 7B is a pictorial diagram 706 of the device 702. As discussed above the prompt can indicate that the media item was provided to the user because the user has expressed an interest in the artist and/or genre. In some instances, the personalized media recommendation system 202 can allow the user to consume the media item while providing the prompt 708 and provide an indication 710 that the media item is, for example, currently playing.

Figure 8:
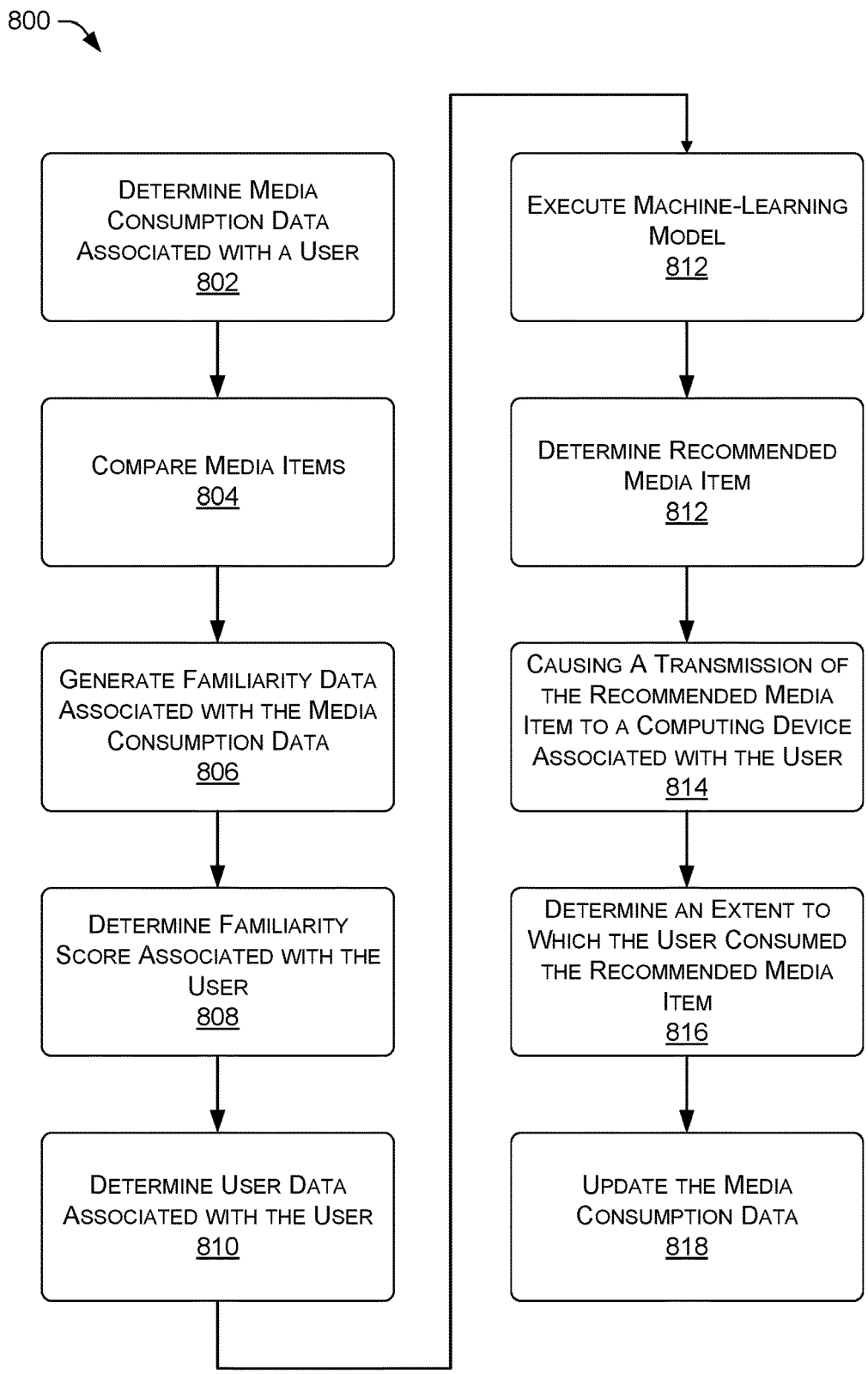
FIG. 8 is a pictorial flow diagram of an example process for generating a recommended media item and updating media consumption data.

FIG. 8 is a pictorial flow diagram 800 of an example process for generating a media item recommendation and updating the media consumption data. The process 800 is described with reference to the computer architecture 300 of FIG. 3. The process 800 can be performed in other similar and/or different environments. Additionally, some portions of process 800 can be omitted, replaced, and/or reordered while still providing the functionality of generating recommendations for media items.

At 802, the media consumption data component 308 can access media consumption data associated with a user. For example, the media consumption data component 308 can receive the media consumption data, such as from the media consumption data database 206 or some other third-party resource. In some instances, the media consumption data component 308 can retrieve the media consumption data. In some instances, media consumption data component 308 can maintain and/or store the media consumption data, such as in a database, datastore, data structure, and so on.

At 804, the comparison component 310 can use the media consumption data to determine media items that the user has consumed. In some instances, the comparison component 310 can identify a first media item and compare the first media item to other media items associated with the media consumption data.

At 806, the familiarity data component 312 can use the comparison component 310 to identify and/or determine media items that the user has consumed more than once. For example, the familiar data component 312 can maintain and/or store indications of the number of times that the user has consumed the media items in familiarity data.

At 808, the familiarity score component 314, can use the familiarity data to determine a familiarity score associated with the user. As discussed above, the familiarity score can indicate a rate that the user consumes familiar media items as compared to novel (i.e., yet to be consumed) media items. In some instances, the familiarity score component 314 can determine a genre familiarity score and/or an artist familiarity score.

At 810, the user data component 316 can access the user data associated with the user from a user data database 204. In some instances, the user data component 316 can store and/or maintain the user data associated with the user. The user data can indicate a user's activities and/or a user's preferences associated with media items.

At 812, the recommendation model component 318 can execute a machine-learning model to generate a media item recommendation. As discussed above, the recommendation model component 318 can use a multi-armed bandit model to identify recommended media items.

At 814, the media item transmission component 330 can access the media item database 208 and transmit and/or cause the transmission of the recommended media item, identified by the recommendation model component 318, to a user interface and/or device associated with the user.

At 816, the consumption extent component 334 can identify an extent to which the user has consumed the recommended media item. For example, the consumption extent component 334 can identify if the user requested a different media item, skipped the media item, and/or determine the extent of the media item consumption.

At 818, based on the extent to which the user consumed the recommended media item, the updating component 336 can update the media consumption data associated with the user in the media consumption data database 206.

For purposes of illustration only, a user 104 can subscribe to a media recommendation service, such as a music streaming service. The user data component 316 can identify user data associated with the user 104 and the media consumption data component 308 can determine media consumption data associated with the user. The user profile component 306 can determine that the media consumption data does not meet or exceed the consumed media items threshold as discussed above. Therefore, the personalized media recommendation system 202 can generate media item recommendations based on, for example, the user data associated with the user 104. The user data can include, for example, the purchases of pop music albums and/or the adding of pop music audio tracks to a music library associated with the user 104. Based on this user data, the personalized media recommendation system 202 can recommend other audio tracks associated with the pop genre.

As the user 104 consumes media items, the media consumption data component 308 can determine that the media consumption data associated with the user 104 meets or exceeds the consumed media items threshold. Then the familiarity data component 312 can determine the familiarity data associated with the media consumption data. Based on the familiarity data, the familiarity score component 314 can generate a familiarity score associated with the user 104. For example, the familiarity score can be represented as 0.7, indicating that the user 104 typically consumes familiar audio tracks as compared to familiar audio tracks. Additionally, the familiarity score component 314 can determine a pop genre familiarity score represented as 0.8 indicating that the user 104 typically consumes pop music and an artist familiarity score represented as 0.1 indicating that the user 104 typically consumes audio tracks from novel artists. Using the familiarity scores associated with the user 104, the recommendation model component 318 can identify media items from a varying set of artists from the pop genre and recommend these media items to the user 104 to consume. Recommendations sent to the user 104 can include songs in the pop genre (or any other genre) that the user 104 has yet to consume if it is determined that the user 104 prefers novel songs, and the recommendations can include songs in the pop genre (or any other genre) that the user 104 has previously consumed if it is determined that the user 104 prefers familiar songs. In some instances, the container component 320 can identify a container curated by the music service that corresponds to novel pop artists. Then the recommendation model component 318 can identify media items associated with the container to recommend to the user 104.

For purposes of illustration only, the user 104 can periodically travel to locations such as a home location, a work location, and an exercise location (e.g., a gym). The contextual data component 322 can determine that the user 104 typically consumes pop music while at home, classical music while at work, and disco music while at the gym. The familiarity score component 314 can determine familiarity scores associated with the different locations and the recommendation model component 318 can identify media items that correspond with the user's 104 location and the user's 104 familiarity preferences at the different locations.

Additionally, after determining that the user 104 has a preference of audio tracks from novel pop artists, the new media item component 324 can identify a newly released music album that is a compilation of audio tracks from new pop artists. The new media item component 324 can provide an indication of the music album and the recommendation model component 318 can identify audio tracks from the music album to recommend to the user 104 and use the prompt component 328 to provide a prompt to the user 104 that provides an explanation regarding the recommendation.

Accordingly, the techniques discussed herein provide a mechanism for identifying a user's media consumption preference and personalizing media item recommendations resulting in an improved user experience when receiving recommended media items.

Figure 9:
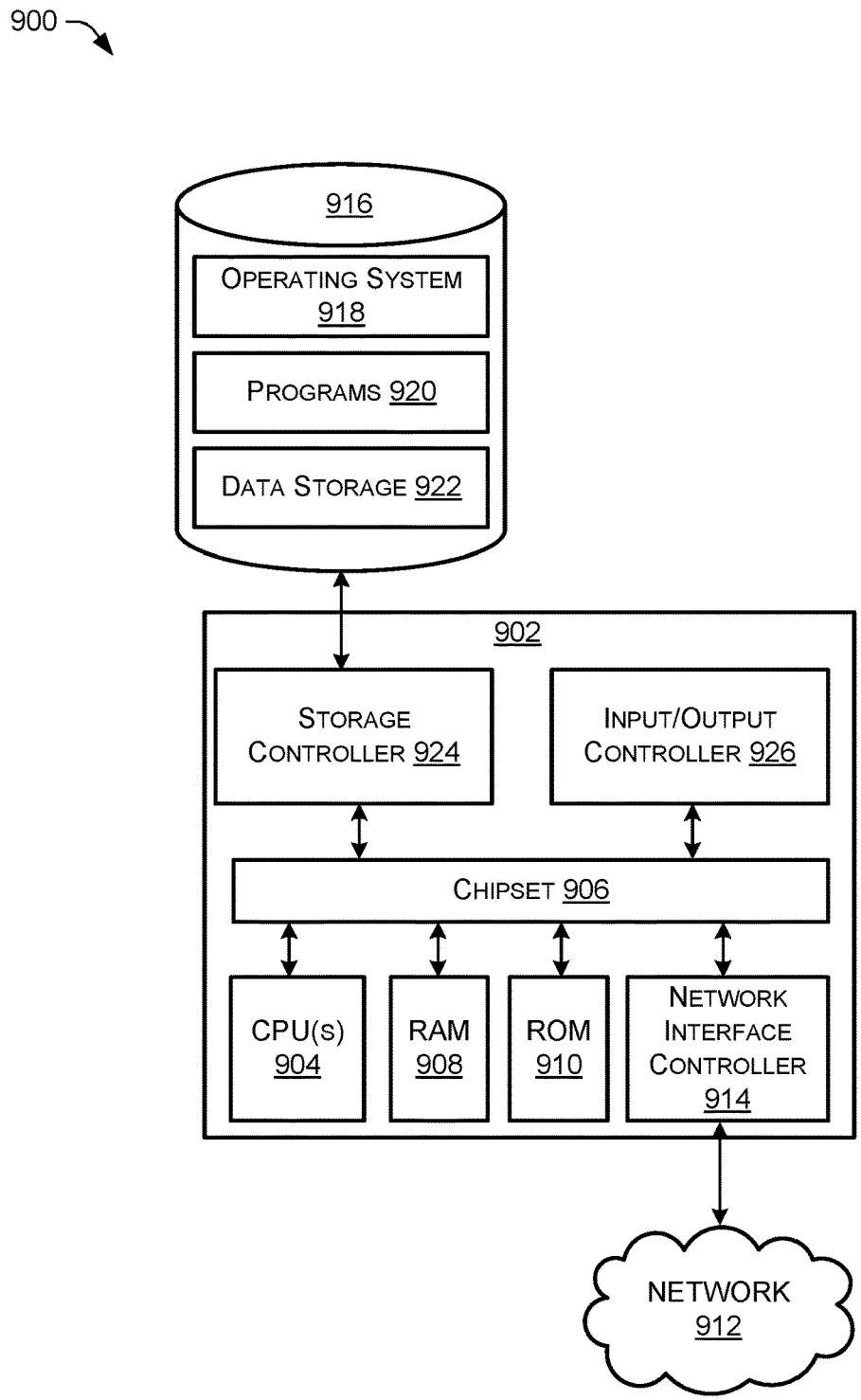
FIG. 9 is a computer architecture diagram showing an illustrative computer hardware architecture for implementing a computing device that can be utilized to implement aspects of the various technologies presented herein.

FIG. 9 is an example computer architecture for a computer 900 capable of executing program components for implementing the functionality described above. The computer architecture shown in FIG. 9 illustrates a conventional server computer, workstation, desktop computer, laptop computer, tablet, network appliance, eBook reader device, smartphone, smart speaker, smart display, television, wearable device (e.g., a watch, an activity tracker, smart glasses, etc.), or other computing device, and can be utilized to execute any of the software components presented herein.

The computer 900 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 900. The chipset 906 can further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM can also store other software components necessary for the operation of the computer 900 in accordance with the configurations described herein.

The computer 900 can operate in a networked environment using logical connections to remote computing devices and computer systems through a network, such as the network 912. The chipset 906 can include functionality for providing network connectivity through a network interface controller (NIC) 914, such as a gigabit Ethernet adapter. The NIC 914 is capable of connecting the computer 900 to other computing devices over the network 912. It should be appreciated that multiple NICs 914 can be present in the computer 900, connecting the computer to other types of networks and remote computer systems.

The computer 900 can be connected to a mass storage device 916 that provides non-volatile storage for the computer. The mass storage device 916 can store an operating system 918, programs 920, and data storage 922, which have been described in greater detail herein. The mass storage device 916 can be connected to the computer 900 through a storage controller 924 connected to the chipset 906. The mass storage device 916 can consist of one or more physical storage units. The storage controller 924 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 can store data on the mass storage device 916 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 916 is characterized as primary or secondary storage, and the like.

For example, the computer 900 can store information to the mass storage device 916 by issuing instructions through the storage controller 924 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 can further read information from the mass storage device 916 by detecting the physical states or characteristics of one or more particular locations within the physical storage units.

In addition to the mass storage device 916 described above, the computer 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 900.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 916 can store an operating system 918 utilized to control the operation of the computer 900. According to one configuration, the operating system comprises the LINUX operating system or one of its variants such as, but not limited to, UBUNTU, DEBIAN, and CENTOS. According to another configuration, the operating system comprises the WINDOWS SERVER operating system from MICROSOFT Corporation. According to further configurations, the operating system can comprise the UNIX operating system or one of its variants. It should be appreciated that other operating systems can also be utilized. The mass storage device 916 can store other system or application programs and data utilized by the computer 900.

In one configuration, the mass storage device 916 or other computer-readable storage media is encoded with computer-executable instructions which, when loaded into the computer 900, transform the computer from a general-purpose computing system into a special-purpose computer capable of implementing the configurations described herein. These computer-executable instructions transform the computer 900 by specifying how the CPUs 904 transition between states, as described above. According to one configuration, the computer 900 has access to computer-readable storage media storing computer-executable instructions which, when executed by the computer 900, perform the various processes described above. The computer 900 can also include computer-readable storage media for performing any of the other computer-implemented operations described herein.

The computer 900 can also include one or more input/output controllers 926 for receiving and processing input from a number of input devices, such as a keyboard, a mouse, a touchpad, a touch screen, an electronic stylus, or other type of input device. Similarly, an input/output controller 926 can provide output to a display, such as a computer monitor, a flat-panel display, a digital projector, a printer, or other type of output device. It will be appreciated that the computer 900 might not include all of the components shown in FIG. 9, can include other components that are not explicitly shown in FIG. 9, or can utilize an architecture completely different than that shown in FIG. 9.

Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A system comprising:
   one or more processors; and one or more computer-readable media storing computer-executable instructions that, when executed, cause the one or more processors to perform operations comprising:
- determining media consumption data comprising a plurality of consumed audio tracks previously consumed by a user and activity data indicating a plurality of items previously viewed by the user;
- comparing individual consumed audio tracks of the plurality of consumed audio tracks;
- comparing individual items of the plurality of items;
- generating, based on comparing the individual consumed audio tracks and comparing the individual items, familiarity data associated with the plurality of consumed audio tracks and novel data associated with the plurality of items;
- determining, based on the familiarity data and the novel data, a familiarity score and a novelty score associated with the user, wherein the familiarity score indicates an audio consumption preference of the user and the novelty score indicates a diversity media consumption preference of the user, wherein the audio consumption preference is based at least in part on at least one of a track repeat frequency, an artist repeat frequency, or a genre repeat frequency, wherein the diversity media consumption preference includes a diversity ratio that is adjusted by the one or more processors based at least in part on current contextual data associated with the user, the current contextual data including a current time and a current location associated with the user, wherein the current time is based at least in part on current time data associated with one of a time of day, a day of week, or a time of year;
- determining user data associated with the user, the user data comprising the activity data, purchase data indicating purchases made by the user, location data indicating locations associated with one or more computing devices associated with the user, shopping data indicating shopping interests of the user, and time data indicating the time of day;
- executing a machine-learning model that uses the familiarity score, the novelty score, and the user data as input data;
- determining, based on executing the machine-learning model, a new audio track of a plurality of new audio tracks;
- transmitting the new audio track to a computing device of the one or more computing devices associated with the user;
- determining an extent to which the user consumed the new audio track using at least one of the one or more computing devices; and
- updating, based on the extent to which the user consumed the new audio track, the media consumption data.

2. The system as recited in claim 1, wherein comparing the individual consumed audio tracks comprises:
- comparing a first consumed audio track of the plurality of consumed audio tracks with a second consumed audio track of the plurality of consumed audio tracks; and
- determining that the second consumed audio track is at least one of:
  - a repeated audio track that has previously been consumed by the user,
  - a repeated artist audio track associated with an artist of the second consumed audio track, or
  - a repeated genre audio track associated with a genre of the second consumed audio track.

3. The system as recited in claim 2, wherein generating the familiarity data comprises:
- determining a repeat counter associated with the second consumed audio track, wherein the repeat counter indicates at least one of:
  - the track repeat frequency indicating a first number of times in which the user has consumed the second consumed audio track,
  - the artist repeat frequency indicating a second number of times in which the user has consumed first audio tracks associated with the artist,
  - or the genre repeat frequency indicating a third number of times in which the user has consumed second tracks associated with the genre.

4. The system as recited in claim 1, wherein the operations further comprise:
- determining a consumed audio tracks threshold, wherein the consumed audio tracks threshold indicates a minimum number of consumed audio tracks of the plurality of consumed audio tracks,
- wherein determining the familiarity score is further based on the plurality of consumed audio tracks meeting or exceeding the consumed audio tracks threshold.

5. A method comprising:
- determining media consumption data comprising one or more consumed media items previously consumed by a user and activity data indicating a plurality of items previously viewed by the user;
- determining, based at least in part on the media consumption data and the activity data, a familiarity score and a novelty score associated with the user, wherein the familiarity score indicates a media consumption preference of the user and the novelty score indicates a diversity media consumption preference of the user, wherein the media consumption preference is based at least in part on at least one of a media item repeat frequency, an artist repeat frequency, or a genre repeat frequency, wherein the diversity media consumption preference includes a diversity ratio that is adjusted by one or more processors based at least in part on current contextual data associated with the user, wherein the current contextual data is based at least in part on current time data associated with one of a time of day, a day of week, or a time of year;
- determining user data associated with the user, wherein the user data comprises the activity data, purchase data, location data, shopping data, or time data;
- executing a machine-learning model that uses the familiarity score, the novelty score, and the user data as input data;
- determining, based at least in part on executing the machine-learning model, a media item for consumption by the user;
- determining media item consumption data indicating an extent to which the user has consumed the media item; and
- updating, based at least in part on the media item consumption data, the media consumption data.

6. The method as recited in claim 5, wherein determining the familiarity score comprises at least one of:
- determining a genre familiarity score that indicates a genre preference of the user, the genre preference associated with a genre of media item genres; or determining an artist familiarity score that indicates an artist preference of the user, the artist preference associated with an artist of media item artists.

7. The method as recited in claim 5, further comprising:
determining at least one of an artist or a genre associated with a consumed media item of the one or more consumed media items; and
determining a new media item associated with at least one of the artist or the genre that has been released within a media item release threshold,
wherein the media item is the new media item.

8. The method as recited in claim 5, wherein the media consumption data further comprises consumption contextual data that comprises at least one of a previous time or a previous location, wherein at least one of the previous time or the previous location is associated with at least one of the one or more consumed media items, and wherein determining the media item comprises:
determining the current contextual data comprising at least one of a current time or a current location associated with a computing device that is associated with the user;
comparing at least a portion of the consumption contextual data with at least a portion of the current contextual data to determine at least one of a time similarity or a location similarity, wherein at least one of the time similarity or the location similarity indicates a contextual similarity between the media item and the at least one of the one or more consumed media items; and
identifying, based at least in part on the contextual similarity meeting or exceeding a current similarity threshold, the media item, wherein the media item is associated with the portion of the current contextual data.

9. The method as recited in claim 5, further comprising:
receiving, from a computing device associated with the user, audio data;
determining, based at least in part on the audio data, that a second user is present; and
identifying, based at least in part on the audio data, a first user profile associated with the user and a second user profile associated with the second user, wherein determining the media consumption data is based at least in part on the first user profile and the second user profile.

10. The method as recited in claim 5, further comprising:
generating, based at least in part on the media consumption data and the user data, one or more media item containers that are associated with one or more media items, wherein an individual media item container of the one or more media item containers is associated with at least one of an artist, an album, a playlist, or a genre,
wherein determining the media item comprises determining the media item that is associated with the individual media item container.

11. The method as recited in claim 10, further comprising:
determining a container size threshold that indicates a minimum number of media items associated with the individual media item container,
wherein generating the one or more media item containers is further based at least in part on the one or more media item containers meeting or exceeding the container size threshold.

12. A system comprising:
one or more processors; and
one or more computer-readable media storing computer-executable instructions that, when executed, cause the one or more processors to perform operations comprising:
determining user data associated with a user, wherein the user data comprises activity data, purchase data, location data, shopping data, or time data;
determining media item data comprising one or more media items associated with the user data;
determining, based at least in part on the media item data, a familiarity score and a novelty score associated with the user, wherein the familiarity score indicates a media consumption preference of the user and the novelty score indicates a diversity media consumption preference of the user, wherein the media consumption preference is based at least in part on at least one of a media item repeat frequency, an artist repeat frequency, and a genre repeat frequency, wherein the diversity media consumption preference includes a diversity ratio that is adjusted by the one or more processors based at least in part on contextual data associated with the user, wherein the contextual data is based at least in part on current time data associated with one of a time of day, a day of week, or a time of year; and
executing a machine-learning model that uses the familiarity score, the novelty score, and the user data as input data; and determining, based at least in part on executing the machine-learning model, a recommended media item for consumption by the user.

13. The system as recited in claim 12, wherein determining the recommended media item comprises:
determining a first media item that is consistent with the media consumption preference;
determining a second media item that is inconsistent with the media consumption preference;
determining that the diversity ratio indicates a likelihood of determining the second media item as the recommended media item; and
determining, based at least in part on the diversity ratio, that the second media item is the recommended media item.

14. The system as recited in claim 13, wherein the operations further comprise:
determining media item consumption data indicating a first extent to which the user has consumed the recommended media item;
determining a recommended media item consumption threshold that indicates a minimum second extent to which the recommended media item has been consumed;
determining that the first extent is less than the minimum second extent; and
updating, based at least in part on determining that the first extent is less than the minimum second extent, the diversity ratio.

15. The system as recited in claim 12, wherein the operations further comprise:
determining event data that comprises at least one of a holiday, a concert event, or a release date of a new media item;
generating a notification associated with the event data, wherein the recommended media item is associated with the event data; and
transmitting, to a computing device associated with the user, the notification comprising a prompt requesting user input.

16. The system as recited in claim 15, wherein the operations further comprise:
receiving, from the computing device associated with the user, the user input comprising a user request to consume the recommended media item; and
transmitting, to a second computing device associated the user, the recommended media item.

17. The system as recited in claim 12, wherein the operations further comprise:
determining a time period since the user has consumed the recommended media item;
determining a recently consumed threshold that indicates a minimum period of time; and
determining that the time period meets or exceeds the recently consumed threshold.

18. The system as recited in claim 12, wherein the operations further comprise:
determining a time period since the user has consumed a media item of the one or more media items;
determining a decay threshold that indicates a maximum period of time;
determining that the time period meets or exceeds the decay threshold; and
associating an expiration tag with the media item,
wherein determining the recommended media item is further based at least in part on the expiration tag.

19. The system as recited in claim 12, wherein the operations further comprise:
determining, based at least in part on determining the recommended media item, a reason code of one or more reason codes, the one or more reason codes comprising at least one of:
a first code indicating that the user is consuming the recommended media item for a first time;
a second code indicating that the recommended media item is associated with an artist associated with a media item of the one or more media items;
a third code indicating that the recommended media item is associated with a playlist associated with the media item;
a fourth code indicating that the recommended media item is associated with a station associated with the media item;
a fifth code indicating that the recommended media item is associated with a genre associated with the media item; or
a sixth code indicating that the recommended media item is associated with an album associated with the media item,
wherein the operations further comprise:
transmitting the reason code to a computing device associated with the user; and
providing, to the computing device associated with the user, an explanation associated with the recommended media item based at least in part on the reason code.

20. The system as recited in claim 12, wherein the operations further comprise:
associating the recommended media item with a first time;
associating the recommended media item with the media item data;
determining a previously recommended tag associated with the recommended media item; and
determining a time period associated with the recommended media item, wherein the time period indicates the user is authorized consume the recommended media item at a second time that is different from the first time.

* * * * *